United States Patent
Iwase et al.

[11] Patent Number: 6,052,705
[45] Date of Patent: Apr. 18, 2000

[54] VIDEO SIGNAL PROCESSOR WITH TRIPLE PORT MEMORY

[75] Inventors: Seiichiro Iwase; Masuyoshi Kurokawa; Takao Yamazaki, all of Kanagawa; Mitsuharu Ohki, Tokyo, all of Japan

[73] Assignee: Sony Corporation, Tokyo, Japan

[21] Appl. No.: 08/701,880

[22] Filed: Aug. 23, 1996

[30] Foreign Application Priority Data

Aug. 30, 1995 [JP] Japan .................................. 7-246627

[51] Int. Cl.[7] .............................. G06F 7/32; G06F 7/38
[52] U.S. Cl. ...................... 708/521; 708/524; 348/719; 348/721; 712/22
[58] Field of Search .................. 364/736.04, 736.05, 364/736.06; 348/718, 719, 721, 716, 720; 708/490, 518, 520, 521, 524; 712/4, 8, 10, 11, 18–25

[56] References Cited

U.S. PATENT DOCUMENTS

| | | | |
|---|---|---|---|
| 4,562,435 | 12/1985 | McDonough et al. | 345/515 |
| 4,658,355 | 4/1987 | Hatakeyama et al. | 712/4 |
| 4,939,575 | 7/1990 | Childers | 348/721 |
| 5,091,783 | 2/1992 | Miyaguchi | 348/24 |
| 5,093,722 | 3/1992 | Miyaguchi et al. | 348/441 |
| 5,301,340 | 4/1994 | Cook | 712/24 |
| 5,418,915 | 5/1995 | Matuda et al. | 712/22 |
| 5,596,376 | 1/1997 | Howe | 348/718 |
| 5,680,178 | 10/1997 | Takeuchi | 348/581 |

OTHER PUBLICATIONS

Labrousse et al; A 50 MHz Microprocessor with a Very Long Instruction Word Architecture; IEEE International Solid-State Circuits Conference, Feb. 1990.

*Primary Examiner*—Emmanuel L. Moise
*Attorney, Agent, or Firm*—Ronald P. Kananen; Radner, Fishman & Grauer PLLC

[57] ABSTRACT

A digital video signal processor using parallel processing includes an input serial-access memory having memory cells in which data is inputted into successive ones of the memory cells in response to a programmed-controlled pointer and a three or more port data memory unit for writing-in data read out from the serial-access memory. An arithmetic logic unit responds to stored-program control to read out data from the data memory, perform a program-prescribed arithmetic operation, and write the result of the arithmetic operation back to the data memory. An output serial-access memory is controlled so that the arithmetic result will be outputted under program control in a sequential manner. Operation of the interconnected components is effected by a stored-program control unit connected to the input serial-access memory, the data memory, the arithmetic logic unit, and the output serial-access memory.

7 Claims, 9 Drawing Sheets

VIDEO SIGNAL PROCESSOR WITH TRIPLE PORT MEMORY

BACKGROUND OF THE INVENTION

1. Field of the Invention

This invention relates to a video signal processor and is applicable to the DSP-LSI (digital signal processor—large scale integrated circuit) chips for television devices, video tape recorders, set top boxes, multimedia computers, and broadcasting equipment.

2. Description of the Related Art

Heretofore, as the construction of a processor which programmably realizes digital signal processing of video signal such as a television signal, there has been a linear array type processor which affects the SIMD control (single instruction stream multi data stream: parallel processing control which operates all processor elements interlocking by means of one program). For example, the construction of this type of processor is disclosed in the U.S. Pat. No. 4,939,575.

As shown in FIGS. 1–3, this processor 1 has a form in which an arithmetic array of 1 bit ALU (arithmetic logic unit) is built into the VRAM (video RAM). The linear type processor 1 can be roughly divided into input SAM (serial access memory) unit 2, data memory unit 3, ALU array unit 4, data memory unit 5, output SAM unit 6 and program control unit 7.

The input SAM unit 2, the data memory unit 3, the ALU array unit 4, the data memory unit 5 and the output SAM unit 6 form altogether a group of linear array type multi-parallelized processor elements, and a number of processor elements are SIMD controlled in an interlocking manner by one common control program in the program control unit 7.

The program control unit 7 comprises a sequence control circuit for the program memory and an incrementable counter value for address generation and controls each part by various control signals connected to other parts according to the program written in the program memory in advance. The input SAM unit 2, the data memory unit 3 and 5, and the output SAM unit 6 are basically memories (VRAMs).

A single element portion of a multi-parallelized processor is defined by a vertically elongated area as shown by the oblique lines in FIG. 1 aligning the horizontal linear array in this Figure. More specifically, the vertically elongated processor elements shown by the oblique lines in FIG. 1 represent respectively the general processor construction shown in FIG. 2 which is necessary to construct one processor element.

The input SAM unit 2 corresponds to an input buffer memory (IQ) 10 of FIG. 2. The output SAM 6 corresponds to an output buffer memory (OQ) 11. The data memory unit 5 corresponds to the first data memory (RFB) 12. The data memory unit 3 corresponds to the second data memory (RFA) 13. The ALU array unit 4 corresponds to selectors (SEL) 14A, 14B and ALU 15 for operating upon the selected data of the first data memory 12 and the second data memory 13 as occasion demands.

The difference between the processor element shown in FIG. 1 and the normal processor is that in a normal processor its hardware is word by word processor which processes per word. However, in the case of this processor, its hardware is bit-wise processor which processes on a per bit basis. This processor can be defined as a 1 bit machine, if the way of expression to be used in the normal CPU, such as 8-bit machine or 16-bit machine is applied. The hardware of the bit processing processor is small and since it can contain a large number of parallelism, in the case for video, the number of linear array parallelism of processor elements is in agreement with the number of pixels H of one horizontal scanning interval period of video signal.

The general construction of this processor element is shown in FIG. 3. In this connection, the construction of each cell of FIG. 3 is shown as a general one in order to facilitate understanding. One processor element portion of the input SAM unit 2 of FIG. 1 is defined in FIG. 3 by multiple input SAM cells 2B aligned vertically and to be controlled by the input pointer 2A. The input SAM cell 2B will be provided vertically aligned for the number of bits (ISB: the number of frontage bits of the input SAM unit) of input signal DIN of FIG. 14,. however, FIG. 3 omits these and one model cell is represented in the Figure.

Regarding one processor element portion of the data memory unit 3, the memory cell 3A in FIG. 3 is provided for the number of MAB bits (MAB is the number of bits of a memory A in the column (vertical) direction) in FIG. 1 and vertically aligned, but FIG. 3 omits these and one cell is representative. The MAB will be provided as many as required as operational memories.

One processor element portion of the ALU array unit 4 is the ALU cell 4A in FIG. 3. Here, the ALU part in the ALU cell 4A is a 1 bit ALU 4B and this is the circuit scale of about the same level as a full adder. In addition to the above, in the ALU cell 4A, selector circuits SEL2–SEL4 for selecting inputs of the ALU 4B are provided. Selectors SEL1–SEL5 select the data from one of buses intersecting with buses shown by X marks in FIG. 3. The data selected by the prescribed selectors SEL2–SEL4 will be given to the ALU 4B through Flip-flop constructed 1-bit registers M—FF3.

Regarding one processor element portion of the data memory unit 5, memory cells 5A of FIG. 3 are provided for the number of MBB bits (MBB is the number of bits of a memory B in the column direction) of FIG. 1 and vertically arrayed. However, FIG. 3 shows one cell as representative. The MBB will be prepared as many as required as operational memories. Also, the memory cells 5A and 3A may be the same.

One processor element portion of the output SAM unit 6 is represented by vertically aligned multiple output SAM cells 6B to be controlled by the output pointer 6A. The output SAM cell 6B will be provided as many as for the number of bits of output signal (OSB: the number of frontage bits of the output SAM unit) in FIG. 1 aligned vertically, however, FIG. 3 shows one representative cell and omits the others.

Input SAM read-out signal SIR, memory access signals SAA and SAB and output SAM write-in signal Sow are word lines of memory cells, and as well as passing through cells horizontally, pass through connecting the same circuit elements arrayed horizontally as well. The word lines of these memory cells are address decoded. Also, for read-modified write, the signal for read-out is generated at the timing of the first half of a cycle and the signal of write-in is generated at the timing of the latter half of a cycle.

Furthermore, in FIG. 3, connection lines which pass through the cells vertically, i.e., bit lines and pointer signal lines, pass through connecting the circuit elements arrayed vertically in the same manner. The input data bus passes through connecting the same circuit elements arrayed horizontally, i.e., input SAM cell 2B, respectively in the same manner. The output data bus passes through connecting the same circuit elements arrayed horizontally, i.e. output SAM cell 6B, respectively as well.

Then, the operation of this processor will be explained referring to FIGS. 1 and 3 as follows. Input signal DIN is led to the input SAM unit 2 through the input data bus. The input pointer 2A generates a 1-bit signal which is logical "H" to only one processor element, that is input pointer signal $S_{IP}$, and input data DIN is written in the input SAM cell 2B of the processor element assigned by the logic "H".

In the input SAM cell 2B assigned by the pointer, transistor Tri changes to on and capacitor C1 becomes the electric potential corresponding to input signal DIN. Input data bus and input SAM cell 2B exist for ISB bits respectively, but, FIG. 3 shows only for 1 bit.

Since the logic "H" signal is moved successively from the left end processor element to the right end processor element in every horizontal scanning interval period of video signal by the input pointer signal $S_{IP}$, the input data DIN can be sequentially stored in the respective capacitors C1 from the input SAM cell 2B of the left end processor element to the SAM cell 2B of the right end processor element. And since the number of processor elements arrayed horizontally is the same as for the number of pixels H of video signal of one horizontal scanning period, by continuing the SAM write-in for one horizontal scanning period in the rightward direction with the clock corresponding to the data rate of the input video signal, the input data DIN for one horizontal scanning period can be stored in the input SAM unit 2. These input operations will be repeated in every horizontal scanning period.

Thus, each time the data of video signal of one horizontal scanning period is stored in the input SAM unit 2, the program control unit 7 SIMD controls the input SAM unit 2, data memory unit 3, ALU array unit 4, data memory unit 5 and output SAM unit 6 and executes the programmed controlled processing. This program control will be repeated in every horizontal scanning period. More specifically, the programs for the number of steps wherein the horizontal scanning period time is divided by the command cycle interval of this processor can be programmed. And since this is SIMD controlled, the following operations can be executed simultaneously at all processor elements.

The input data DIN stored in the input SAM unit 2 for one horizontal scanning period is transferred to the data memory unit 5 from the input SAM unit 2 under the control of the program control unit 7 as necessary in the following one horizontal scanning interval and will be used for the following arithmetic processing. This transfer operation from the input SAM unit 2 to the data memory unit 5 will be executed by selecting the memory content of the necessary bits of the input SAM unit 2 using the input SAM read-out signal SIR and accessing and writing in by outputting the memory access signal SAB to the prescribed memory cell 5A of the destination data memory unit 5.

Here, the input SAM read-out signal SIR and memory access signal SAB are word lines and there exist multiple numbers respectively but these are decoded by the address decoder. Because these memory access are read-modified write mode operation, a signal for read-out is generated at the first half of a cycle and a signal for write-in will be generated at the latter half of a cycle.

In the input SAM cell 2B selected by the input SAM read-out signal SIR, transistor Tr2 becomes-on at the first half of the cycle and transmission data signal corresponding to the electric potential of capacitor C1 is produced on the upper side of vertical bit line. This data transfer is conducted one bit per one cycle through the vertical bit lines. In transferring the data, the ALU 4B has nothing to process but makes to pass through the ALU cell 4A. More specifically, in this cycle, each selector SEL1–SELS selects the path so that the transfer data passes through the ALU 4B and a command of no arithmetic operation is sent to the ALU 4B. Then ALU output control signal SBB is generated at the fixed timing and the transistor Tr5 turns on and then the ALU output is outputted to the lower part bit line at the latter half of the cycle.

In the transfer data passed through the ALU 4B, transistor Tr6 of the prescribed memory cell 5B of the data memory unit 5 selected by the memory access signal SAB turns on in the latter half of the cycle and capacitor C3 changes to the electric potential corresponding to the transfer data.

The read-out signal SIR to each input SAM cell 2B of the input SAM unit 2 and the memory access signal SAA to each memory cell 3A of the data memory unit 3 are in the same address space and decoded at the ROW decoder with the same memory and given as word lines.

At the time when arithmetically processing the data, if both two data necessary for arithmetic are extant in either of the data memory 3 or the data memory 5, the arithmetic operation cannot be started at once, therefore, firstly for its preparation, by outputting the memory access signals SAA and SAB to the prescribed memory cell between the data memory unit 3 and the data memory unit 5 -according to demands, write-in and read-out are conducted and the data are transferred.

For example, in the case of transferring from the data memory unit 5 to the data memory unit 3, the read-out memory access signal SAB is outputted to the prescribed memory cell 5A of the data memory unit 5 and after putting the transistor Tr6 in its on condition at the first half of the cycle, the transferring data corresponding to the electric potential of the capacitor C3 is outputted to the lower bit line. There is nothing to process at the ALU 4B as in the case of data transfer to the data memory unit 5 from the input SAM unit 2. However, the ALU array unit 4 is controlled in order to pass the data through the ALU cell 4A, the ALU output control signal SEA is generated at the fixed timing and the transistor Tr4 is put in the 'on' condition and the transferring data is outputted to the upper bit line at the latter half of the cycle. Then, outputting the write-in memory access signal SAA to the prescribed memory cell 3A of the data memory unit 3, the transistor Tr3 is put on at the latter half of the cycle, and the capacitor C2 changes to the electric potential corresponding to the transfer data.

With this arrangement, the input data DIN written in the past as described above, and the data which is being operated upon are recorded on the data memory unit 3 and the data memory unit 5. In utilizing these data and the data stored in the 1-bit register FF in the ALU cell 4A, the necessary arithmetic processing per bit can be successively conducted in the ALU 4B.

For example, the case of writing in the addition result to the memory cell 5A of the bit just read out now in the data memory unit 5 by adding the data of memory cell 3A of bit in the data memory unit 3 and the data of memory cell 5A of bit in the data memory unit 5 will be explained as follows:

More specifically, the read-out signal SAA is outputted to the memory cell 3A having the fixed bits in the data memory unit 3 and the read-out signal SAB is outputted to the memory cell 5A with the fixed bits in the data memory unit 5 in the first half of the cycle, and putting transistors Tr3 and Tr6 of both memory cells on condition, data will be outputted to respective bit lines.

As to the data read out from the data memory unit 3 and the data read out from the data memory unit 5, the program control unit 7 makes the selector SEL of the ALU array unit 4 select the prescribed path and makes the ALU 4B to conduct an addition operation. The resultant data of the arithmetic operation of the ALU 4B will be outputted to the lower bit line at the latter half of the cycle by generating the ALU output control signal SBB at the fixed timing and turning the transistor Tr5 on. Then, the write in memory access signal SAB is outputted to the prescribed memory cell 5A of the data memory unit 5 and turning the transistor Tr6 on at the latter half of the cycle and the capacitor C3 changes to the electric potential corresponding to the ALU output data.

The arithmetic operation in this ALU cell 4A will be assigned by ALU control signal SALU-CONT from the program. The result of arithmetic operation at the ALU cell 4A can be written in again either in the data memory unit 3 or the data memory unit 5, or can be stored in the 1 bit register FF in the ALU cell 4A as necessary. In the case of addition, most commonly, the carry is led to the 1 bit register FF and the sum is led to the data memory unit 5.

With this arrangement, the data can be read out from the data memory unit 3 and the data memory unit 5 arranged on the upper side and lower side of the ALU cell 4A corresponding to the programs, and upon conducting the necessary arithmetic operation or logical operation at the ALU array unit 4, the data can be written again in the prescribed address of the data memory unit 3 or the data memory unit 5. These arithmetic processings are all bit processing and can be processed 1 bit per cycle.

At this point, when the arithmetic processing supposed to be processed in the one horizontal scanning period is complete, it is necessary to transfer the output data which is already through the arithmetic processing to the output SAM unit 6 within its horizontal scanning period at the final part of the program.

In the case where the data supposed to be outputted at present exists in the data memory unit 3, memory access signal SAA is led to the prescribed memory cell 3A at the first half of a cycle and read out and passed through the ALU array unit 4, and the write-in signal $S_{OW}$ is outputted to the output SAM cell 6B at the latter half of a cycle in order that the data will be transferred to the output SAM cell 6B with the fixed bits of the output SAM unit 6. The data will be transmitted one bit by one bit through the bit lines in the vertical direction. At this point, there is nothing to process in the ALU 4B in case of transferring the data, but since the data is to pass through the ALU cell 4A, the ALU output control signal SBB will be generated at the fixed timing. Detailed operational descriptions will be omitted since the operation is identical to that of the above.

The write-in signal $S_{OW}$ to each output SAM cell 6B in the output SAM unit 6 and the memory access signal SAB to each memory cell 5A in the data memory unit 5 are in the same address space and will be decoded by ROW -decoders having the same memory and given as word lines.

As described above, in one horizontal scanning interval time, the transfer of the input data DIN stored in the input SAM unit 2 to the data memory units 3 and 5, data transfer between the required data memory units 5, the necessary arithmetic processing and the output data transfer to the output SAM unit 6 are controlled by the SIHD control program which effects processing on a bit-wise basis. This program processing will be repeated processing the horizontal scanning period as an unit. Since all processor elements operate in an interlocking manner, the same processing will be executed with respect to the number of pixels H for the horizontal scanning period.

The output data transferred to the output SAM unit 6 after the above program processing is complete will be further outputted from the output SAM unit 6 in the following horizontal scanning period as follows.

The output data is led to the output data bus from the output SAM unit 6 and outputted externally of the processor 1. The output pointer 6A generates 1 bit signal which is logical "H" only to one processor element, i.e., output pointer signal SOP, and the output data is read out to the output data bus from the output SAM cell 6B of the processor element assigned by the logic "H" and becomes to be output data DOUT. The output data bus and output SAM cell 6B exist OSB bits respectively, however, FIG. 3 shows only for 1 bit.

In the output SAM cell 6B assigned by the output pointer 6A, the transistor Tr8 turns on and the output signal corresponding to the electric potential of the capacitor C4 will be obtained in the output data bus. Since the "H" signal according to the output pointer signal SOP moves from the left end to the right end processor element in every one horizontal scanning period of the video signal, the read-out of output data moves successively from the output SAM cell 6B of the left end processor element to the output SAM cell 6B of the processor element in the right direction. Here, because the number of processor elements aligned horizontally are for the number of pixels H of one horizontal scanning period of video signal, the output data for one horizontal scanning period can be outputted from the output SAM unit 6 with the clock corresponding to the data rate of output video signal. These output operations will be repeated in every horizontal scanning period.

As described above on the program control processor called generally as CPU or DSP in FIG. 2, firstly the input data DIN is written in the data memory unit 12 via the input buffer memory 10 and the data just written in the data memory unit 12 and the data inputted before or the data in the data memory unit 12 or data memory unit 13, which is arithmetically processed before and being processed will be selected at the memory address and selectors 14A and 14B and led to the ALU 15 and arithmetically operated upon, and again stored in the data memory unit 12 and/or data memory unit 13. Then, the arithmetic processing result will be outputted from the data memory unit 12 through the output buffer memory 11.

In a linear array type processor 1 of FIG. 1, an input SAM unit 2 which corresponds to the input buffer memory 10, an output SAM unit 6 which corresponds to the output buffer memory 11, a data memory unit 5 corresponding to the data memory 12, a data memory unit 3 corresponding the data memory 13, and an ALU array unit 4 corresponding to selectors 14A and 14B and ALU 15 are provided.

Furthermore, in the linear array type processor 1, assuming that the input operation by write-in of input data DIN into the input SAM unit. 2 to be the first operation, the transfer of input data DIN stored in the input SAM unit 2 to data memory units 5, the transfer of data between data memory units 3 and 5 and the necessary arithmetic operations and the transfer of the output data DOUT to the output SAM unit 6 to be the second operation, and the output operation by read-out of output data DOUT to the output SAM unit 6 to be the third operation, these three operations are interconnected like a so called pipe-lining operation making one horizontal scanning period of the video signal as a unit, and with respect to the input data DIN of one horizontal scanning period, each operation would be executed in the form of delaying by one horizontal scanning period time, thus three operations can be continuously processed simultaneously.

In the conventional processor 1 formed by an architecture as shown in FIG. 1, for example, if the length in the vertical direction were extended in FIG. 1, memory sizes of the input SAM unit 2, data memory unit 3, data memory unit 5, and output SAM unit 6 are increased, the address space of each data memory would be enlarged increasing the working memory whereas its operational performance would not change at all. Moreover, if the length in the horizontal direction were extended, i.e., the number of parallel processor elements were increased, it has no effect on the device since the parallelism number of processor elements will be used corresponding to the number of pixels of one horizontal scanning period of video signal to be applied.

The only way to improve the operational performance of the processor having this kind of architecture is to increase its command cycle, to parallelize the ALU, or to parallelize the whole processor system.

When each memory cell of input SAM cell 2B of the input SAM unit 2, memory cell 3A of the data memory unit 3, memory cell 5A of the data memory unit 5 and output SAM cell 6B of the output SAM unit 6 is formed by DRAM construction (dynamic random access memory), the access time is slow and it becomes a disadvantage in increasing the operating speed of memory. However, if it is not formed by DRAM, the memory size becomes large. Moreover, since the read modified write conducts both reading and writing operations within one cycle, its processing speed becomes slow.

Furthermore, since the command cycle in the processor 1 is a period from the time when data is read out from two data sources and arithmetically processed at the ALU 4B till it is written in the data destination and since the data passes through the ALU 4B in the course of its operations, the data processing path is long and speeding up the operation is difficult.

In the construction of FIGS. 1 and 3, if the ALU 4B were parallelized in order to improve the operational performance of ALU cell 4A of the ALU array unit 4, the width is extended, the length becomes too long and the dimensional balance of a processor element becomes unbalanced and space would be wasted since the element of the processor 1 is physically composed with very narrow shape, approximately the same width of a memory cell. Moreover, by parallelizing the whole processor 1, if the processing capacity increases N times by parallelizing N numbers, the hardware scale also increases N times.

Furthermore, the processor 1 comprises input SAM unit 2, data memory unit 3, ALU array unit 4, data memory unit 5 and output SAM unit 6 which are arranged in that order and each input SAM cell 2B of the input SAM unit 2 and each memory cell 3A of the data memory unit 3 are in the same address space and decoded by the ROW decoder with the same memory. Also, each output SAM cell 6B of the output SAM unit 6 and each memory cell 5A of the data memory unit 5 are in the same address space and decoded by the ROW decoder different from the ROW decoder described above.

Accordingly, restrictions have been imposed in the case of transferring the data to the data memory from the input SAM unit 2, such as the data destination must be the data memory unit 5 of the other side with the ALU array unit 4 between, or in the case of transferring the data from the data memory to the output SAM unit 6, its data source must be the data memory unit 3 of the other side with the ALU array unit 4 between.

Furthermore, in the case of arithmetically processing two pieces of data in the data memory unit 3, there was a restriction that the arithmetic processing must be started after one of the data in the data memory unit 3 had been transferred to the data memory unit S.

Moreover, there are MAB and MBB bit numbers of memory cells in the data memory unit 3 and data memory unit 5 respectively. However, since the data memory is divided into both sides of the ALU-array unit 4, in the case of processing some application under a certain condition, there are cases where the data memory unit 3 is short of memory capacity because almost all memory cells have been used up, whereas a number of memory cells have not been used in the data memory unit 5, and the memory address space has not been utilized effectively.

SUMMARY OF THE INVENTION

In view of the foregoing, an object of this invention is to provide a video signal processor capable of improving further the processing capacity by solving the conventional problems at once.

The foregoing objects and other objects of the invention have been achieved by the provision of a multi-parallel digital signal processor type video signal processor wherein bit processing processor elements are linearly arrayed, its construction element is to be formed at least by a serial access memory unit, a data memory unit and an ALU array unit and the data memory unit is formed by the memory with more than two ports.

As a result, the data transfer between two data memory units prior to processing operation, that was necessary in the conventional two data memory construction becomes unnecessary.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 4:
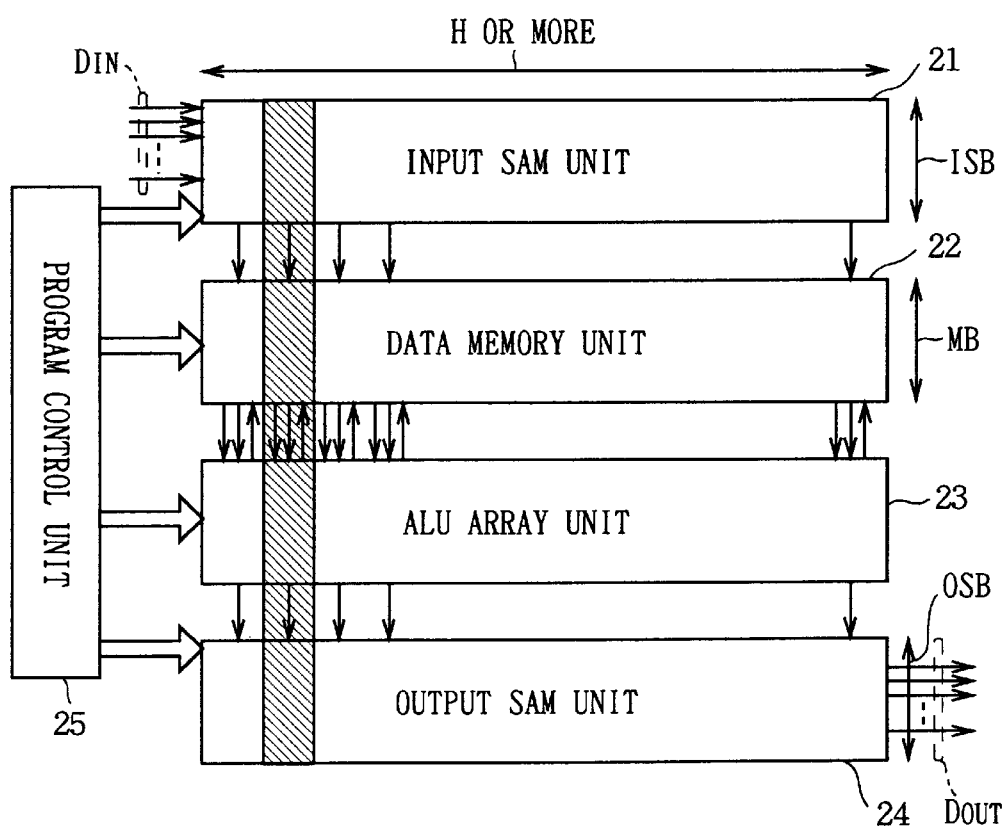
FIG. 4 is a block diagram showing the construction of a video signal processor according to the embodiment.

Preferred embodiment of this invention will be described with reference to the accompanying drawings:

In FIG. 4, processor 20 generally shows a video signal processor according to this invention. The processor 20 is formed by an input SAM (serial access memory) unit 21, a data memory unit 22, an ALU array unit 23, an output SAM unit 24 and a program control unit 25.

The input SAM unit 21, data memory unit 22, ALU array unit 23 and output SAM unit 24 form a group of processor elements linearly arrayed and multi-parallelized, and these large number of processor elements are SIMD controlled by a common program control unit in the program control unit 25.

Figure 1:
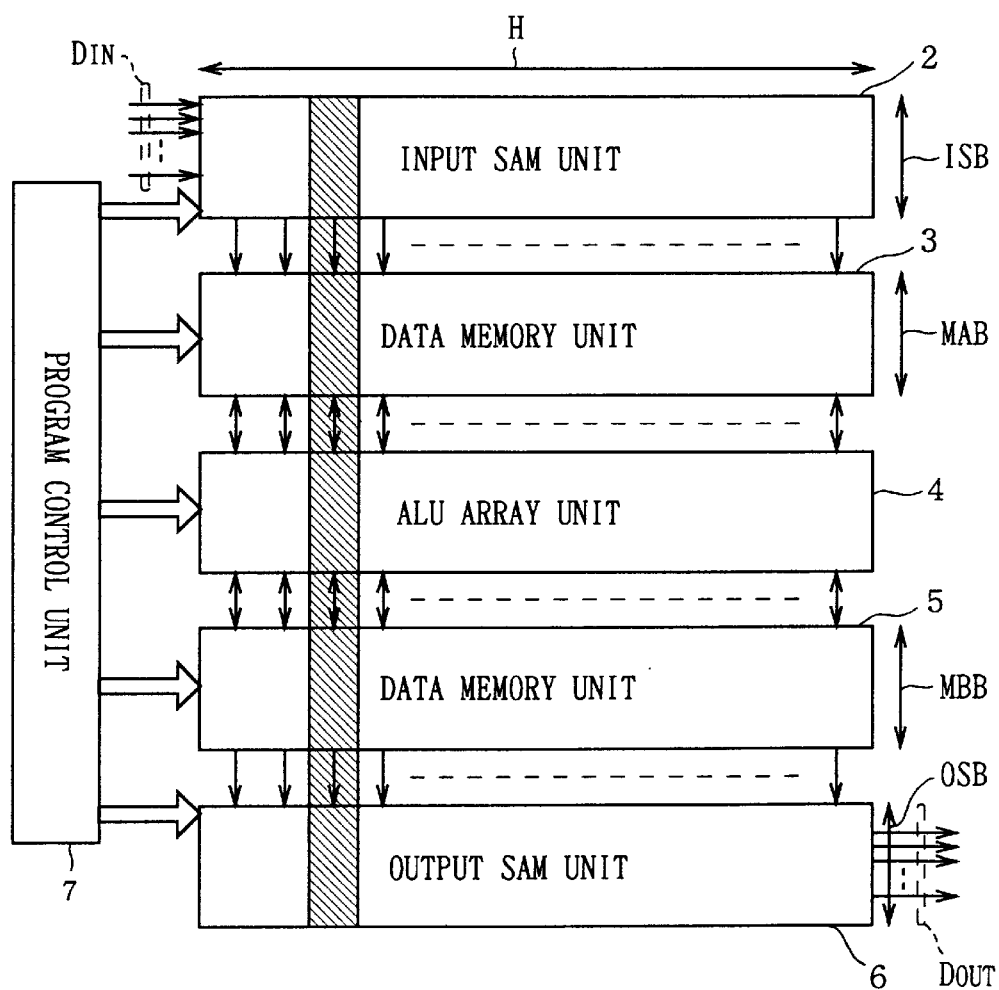
FIG. 1 is a block diagram showing the construction of the conventional linear array type processor.
Figure 2:
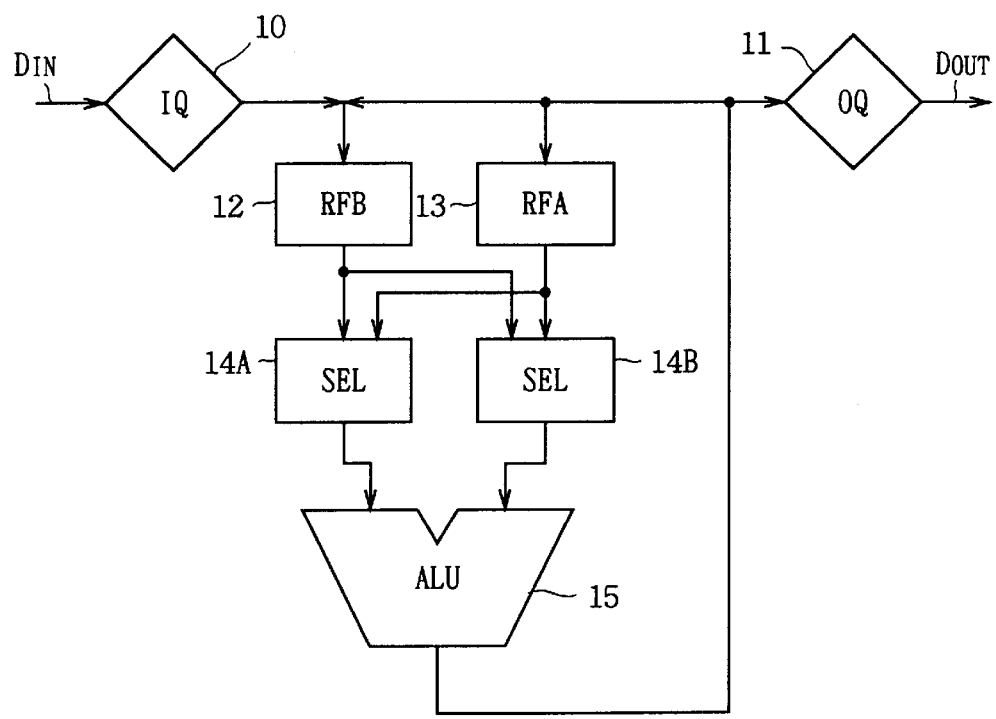
FIG. 2 is a block diagram showing the construction of the general processor.
Figure 3:
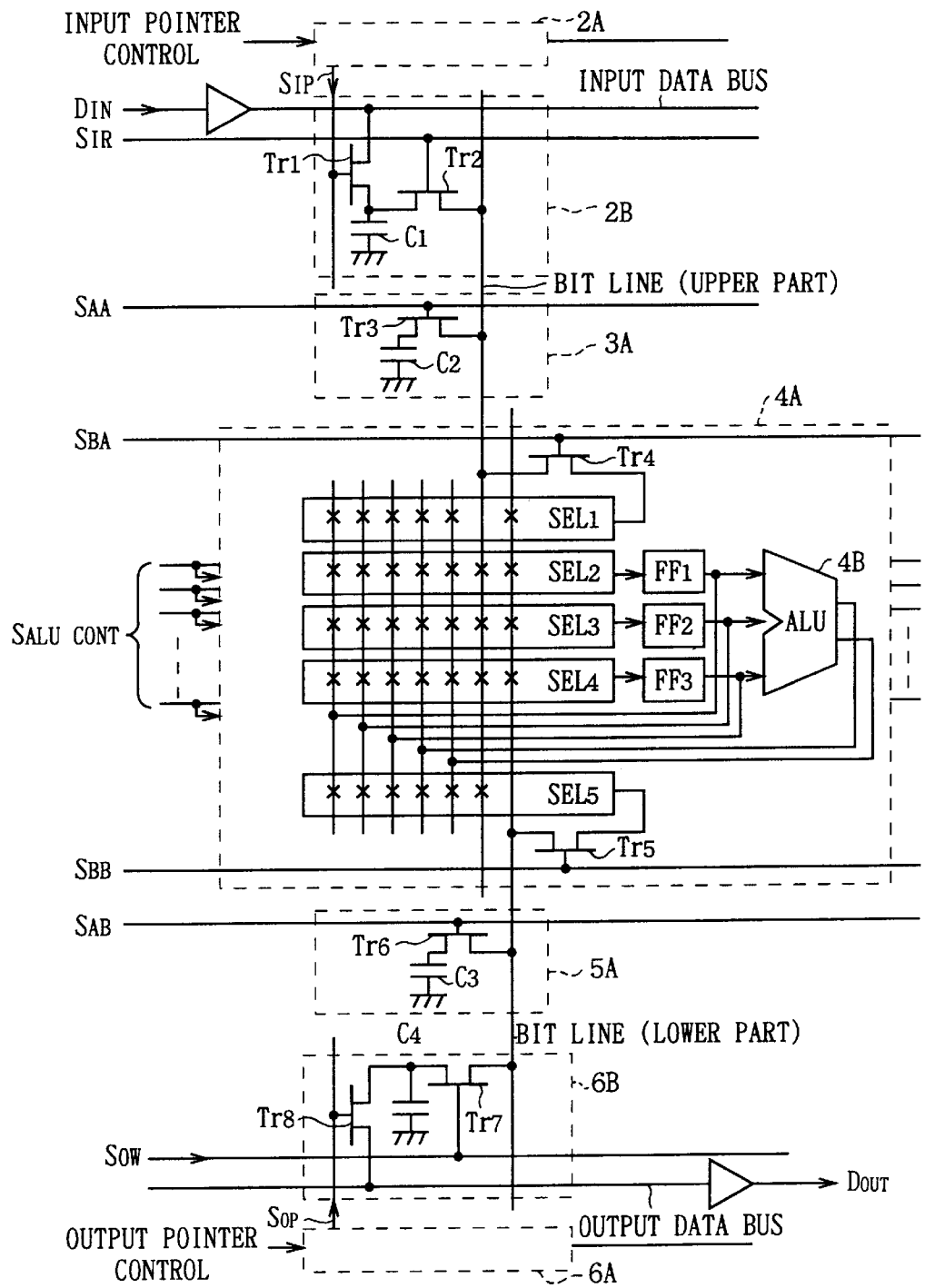
FIG. 3 is a connection diagram showing a model of the conventional processor elements.

Since the construction of the input SAM unit 21, output SAM unit 24 and program control unit 25 is the same as that of the conventional construction described above in FIG. 1 and FIG. 3, the repetitive explanation will be omitted.

The input SAM unit 21, data memory unit 22 and output SAM unit 24 are basically memories and placed in the same address space. More specifically, each access the same bit lines, so that in transferring data between memories, read-out and write-in of data can be conducted in one cycle. The ROW address decoder for these memories is included in the program control unit 25 in FIG. 4 and will be roughly explained in the following.

A single element portion of multi-parallelized processor elements is a vertically elongated region shown by oblique lines and linearly arrayed in the horizontal direction in FIG. 4. More specifically, generally speaking, one element is equivalent to the construction of processor shown in FIG. 5. The processor element of the processor 20 is also the bit processing processor identical to that of the conventional example described above.

Figure 5:
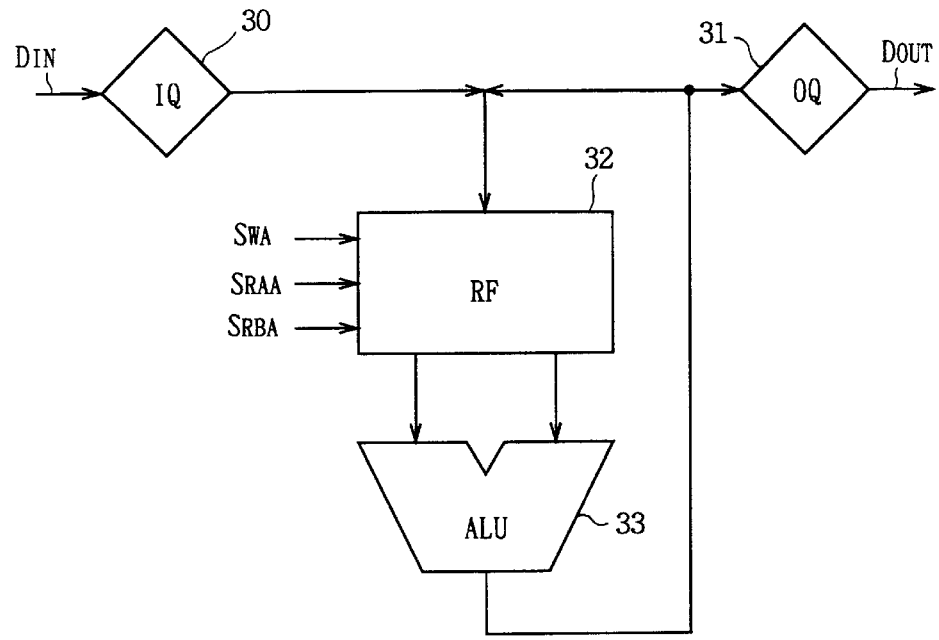
FIG. 5 is a block diagram showing the video signal processor of the embodiment corresponding to the construction of the general processor.

The input SAM unit 21 corresponds to the input buffer memory (IQ) 30 of FIG. 5, the output SAM unit 24 corresponds to the output buffer memory (OQ) 31, the data memory unit 22 corresponds to the data memory (RF) 32, and the ALU array unit 23 corresponds to the ALU 33.

The data memory 32 of FIG. 5, i.e., the data memory unit 22 of FIG. 4, has a 3 port memory different from the conventional one. More specifically, it can conduct 2 read-outs and 1 write-in at the same time during a cycle. Accordingly, three addressings can be conducted to the memories 32 and 22 simultaneously. Two read-out ports are connected to the ALU 33 of FIG. 5 i.e., ALU array unit 23 of FIG. 4, and the output of ALU 33, i.e., ALU array unit 23 is connected to the write-in port of the data memory 32, i.e., data memory unit 22.

In the case of this embodiment, memories of input SAM unit 21, data memory unit 22 and output SAM unit 24 do not conduct read-modified write operations as in conventional devices. They have bit lines reserved exclusively for write-in and read-out and they are utilized fully during the access cycle time.

The data memory 32 of FIG. 5, i.e., data memory unit 22 of FIG. 4, is a 3 port memory having bit lines for each port, and one arithmetic operation per cycle via the ALU can be successively conducted because pipe lining processing (to be described later) is performed. The parallel number of linear arrayed processor elements is made to be the same or more as the pixel number H of one horizontal scanning period of video signal.

Figure 6:
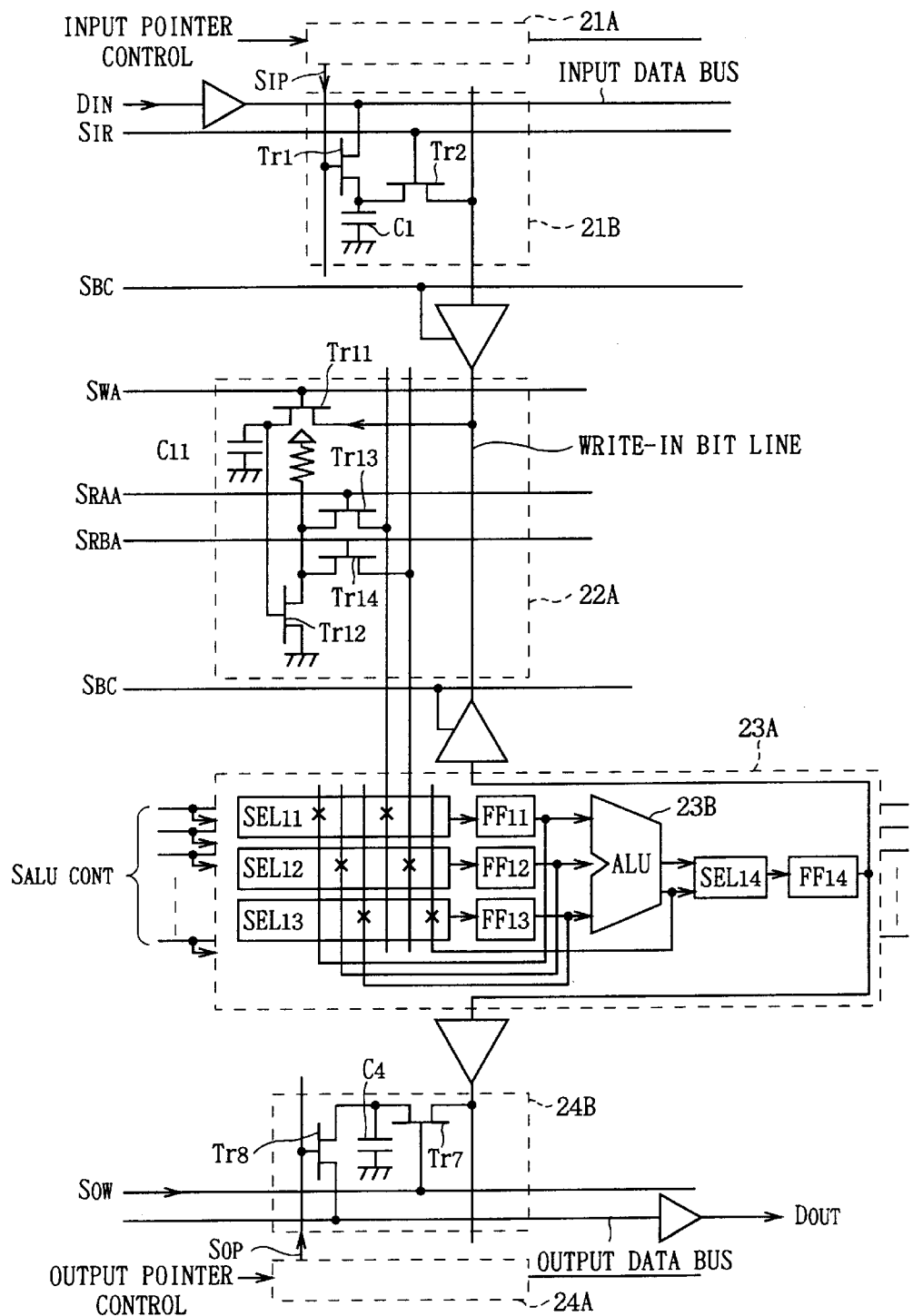
FIG. 6 is a connection diagram showing a model of processor element according to the embodiment.
Figure 7:
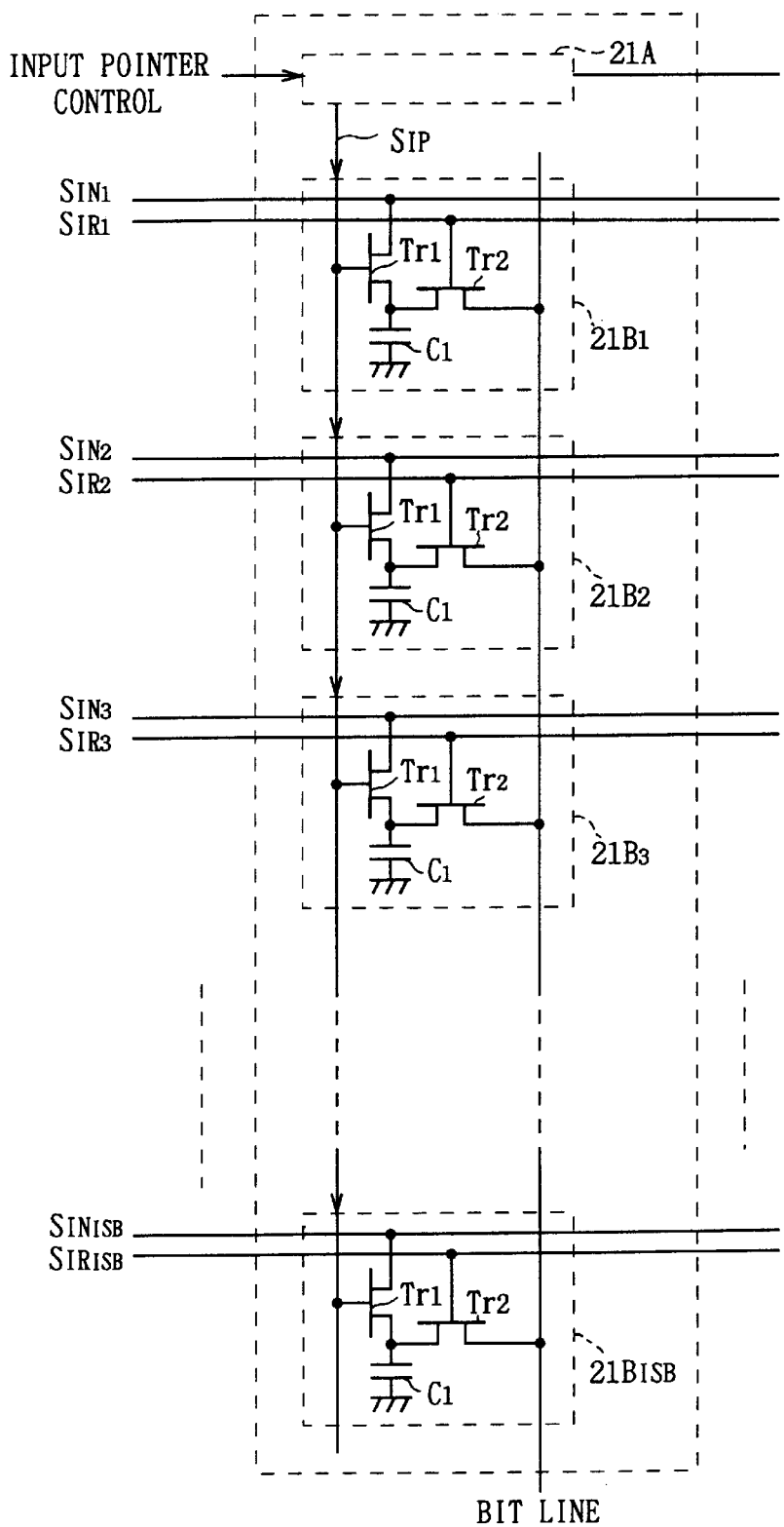
FIG. 7 is a connection diagram showing the construction of input SAM unit.
Figure 8:
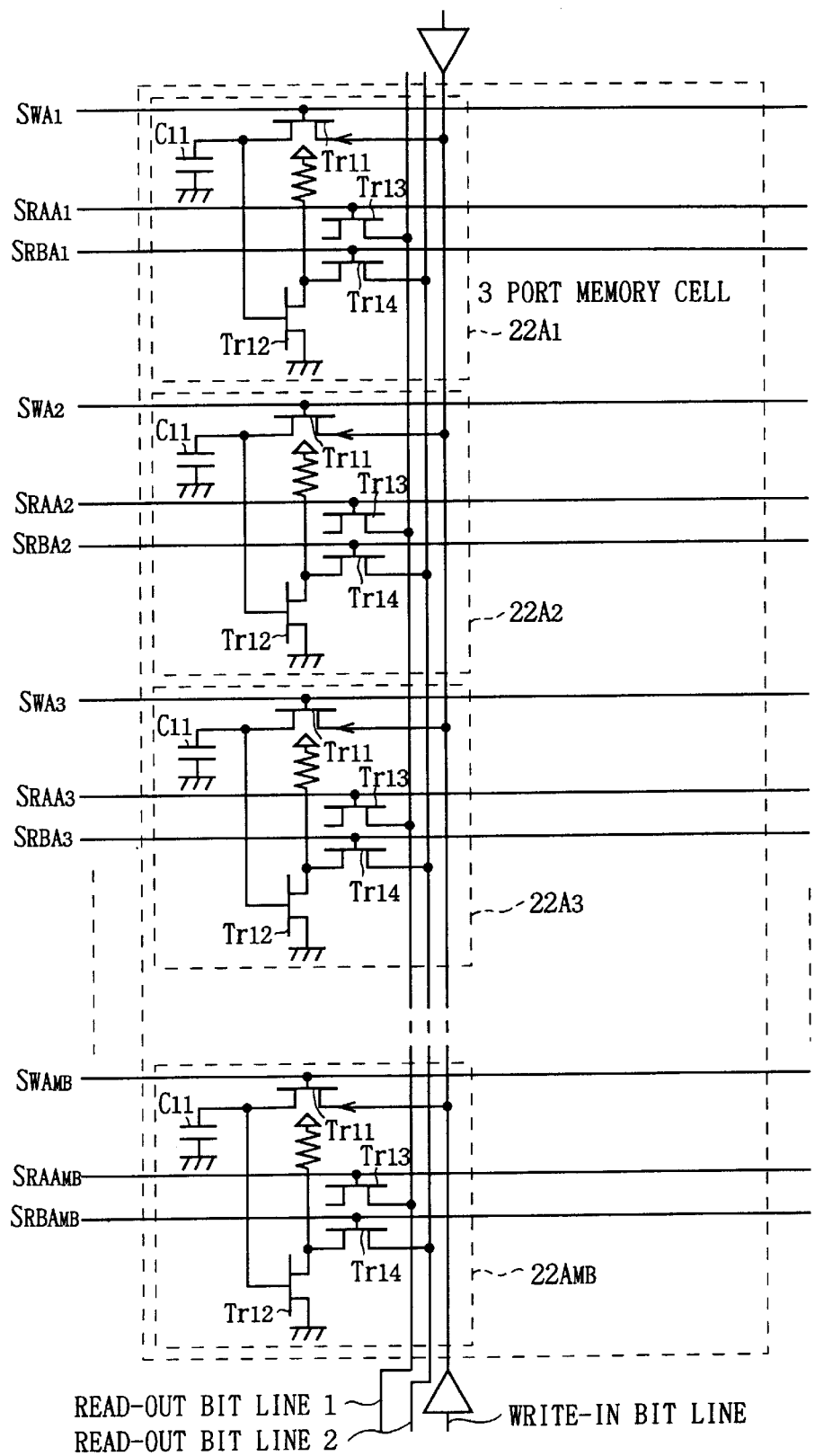
FIG. 8 is a connection diagram showing the construction of data memory unit.

At this point, the construction of processor elements in the processor 20 can be shown like FIG. 6. One processor element portion of the input SAM unit 21 is shown in FIG. 7. The input SAM unit comprises an input pointer 21A and multiple input SAM cells 21B which are controlled by the input pointer 21A, where these are arrayed vertically. In practice, the input SAM cells 21B are provided for the bit number (ISB) of input data DIN of FIG. 4 aligning vertically. However, in order to simplify the matter, FIG. 6 shows a figure for one cell by omitting the others.

One processor element portion of the data memory unit 22 is shown in FIG. B. In practice, 3 port memory cells 22A are provided for the bit numbers of MB of FIG. 4, but FIG. 6 shows only one cell, omitting the others. Also, the bit number MB of memories are prepared as many as needed for working memories of arithmetic operations.

One processor element portion of the ALU array unit 23 is the ALU cell 23A in FIG. 6. Here, the ALU part in the ALU cell 23A is 1 bit ALU 23B and is a circuit scale approximately the same as a full adder. Besides, selectors SEL11–SEL13 for selecting the input of ALU 23B are provided in the ALU cell 23A. The selectors SEL11–SEL13 select the data from one bus from multiple intersections shown by X marks in the figure. Moreover, the data selected by selectors SEL11–SEL13 are given to the ALU 23B through 1 bit registers FF11–FF13.

Figure 9:
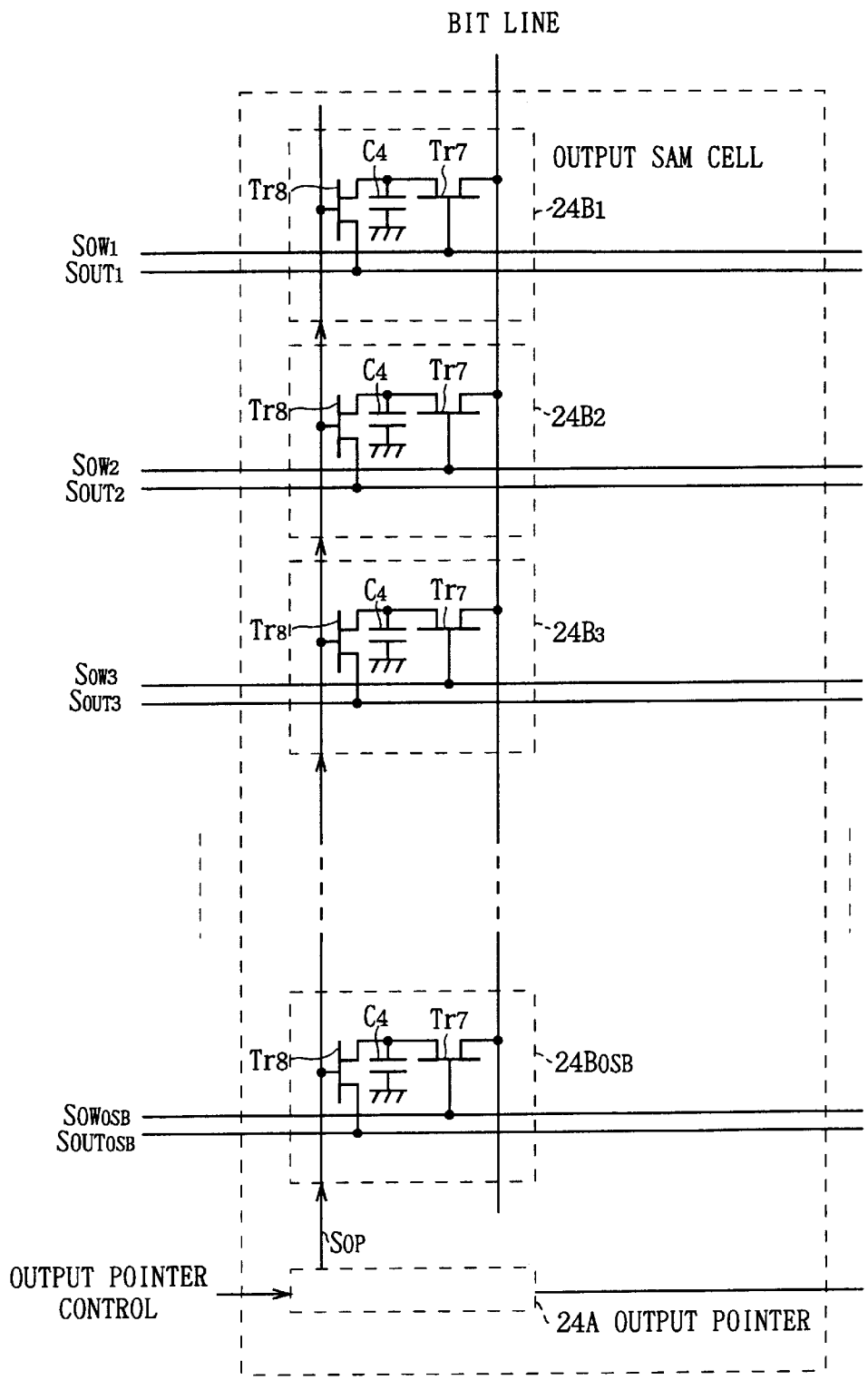
FIG. 9 is a connection diagram showing the construction of output SAM unit.

FIG. 9 shows one processor element of the output SAM unit 24. The output SAM unit 24 comprises an output pointer 24A and multiple output SAM cells 24B which are aligned vertically to be controlled by the output pointer 24A. In practice, the output SAM cells 24B are provided for the bit number (OSB) of output signal of FIG. 4 aligned vertically. However, by omitting these, FIG. 6 shows a diagram of one cell for the others.

Input SAM read-out signal SIR, memory access signals SWA, SRAA, SRBA, output SAM write-in signal $S_{OW}$ are word lines of memory cells, and as well as passing through each cell, they pass through the same circuit element lined up horizontally by connecting them, supposing that these word lines of memory cells are address decoded.

Furthermore, connection lines passing through cells vertically, i.e., bit lines and pointer signal lines, pass through the circuit elements lined up vertically by connecting them in the same manner.

The input data buses pass through the same circuit elements, i.e., the input SAM cells 21B, lined up horizontally, by similarly connecting them. The output data bus also passes through the circuit elements, i.e., the output SAM cells 24B, lined up horizontally, by connecting them in the same manner.

Then, the operation of this processor will be described below referring to FIGS. 4 and 6.

The input signal DIN is led to the input SAM unit 21 via input data bus. The write-in operation control by the input pointer 21A to the input SAM cell 21B is the same as that of the conventional device. Since there are more numbers of processor elements aligned horizontally than the number of pixels H of one horizontal scanning period of video signal, the input data DIN for one horizontal scanning period can be stored in input SAM unit 21 by continuing the SAM write-in for one horizontal scanning period in the right direction at the clock corresponding to the data rate of input video signal. These input operations will be repeated in every horizontal scanning period.

The operation of the program control unit 25 is the same as the conventional operation. Whenever the data of one horizontal scanning period of video signal is stored in the input SAM unit 21, input SAM unit 21, data memory unit 22, ALU array unit 23 and output SAM unit 24 are SIMI controlled and processed. This program control is repeated per horizontal scanning period. More specifically, programs as many as the number of steps of which the horizontal scanning period time is divided by the command cycle period of this processor can be programmed.

Since the case of this embodiment is also SIMD controlled, the following operations will be executed simultaneously on all processor elements.

The input data DIN stored in the SAM unit 21 for one horizontal scanning period is transferred to the data memory unit 22 from the input SAM unit 21 under the control of program control unit 25 as occasion arises and will be used for computing processing afterwards. This transfer operation from the input SAM unit 21 to the data memory unit 22 can be realized by selecting the memory content of necessary bits of the input SAM unit 21 by the input SAM read-out signal SIR and accessing and outputting memory access signal SWA to the prescribed 3 port memory cell 22A of the transfer destination data memory unit 22 and writing in. Here, the input SAM read-out signal SIR and memory access signal SWA are word lines and exist multiple numbers respectively, and these are decoded by the address decoder.

In the input SAM cell 21B selected by the input SAM read out signal SIR, transistor Tr2 becomes on and transfer data signal corresponding to the electric potential of capacitor C1 is generated in the vertical bit lines connecting to the data memory unit 22. On the other hand, in the 3 port memory cell 22A selected by the memory access signal SWA, transistor Tr11 turns on and capacitor C11 changes to the electric potential corresponding to the transfer data. At this time, bit line control signal SBC and its inverted signal SB select the input SAM unit 21 as a source of write-in bit lines of the data memory unit 22.

This data transfer will be executed 1 bit per cycle via bit lines in the vertical direction. In the case of transferring the data at this time, it does not pass through the ALU 23B nor conduct the read-modified write operation different from the conventional device.

In the case of arithmetic processing of the data, according to this embodiment, the data necessary for calculation is always in the data memory unit 22, and since the data memory unit 22 is a 3-port memory including 2 read-out ports, it is not necessary to transfer the data between the data memories different from the case where the data memory unit is divided into two as the conventional device.

In the data memory unit 22, the input data DIN written in as described above in the past and the data being calculated are always stored. And in utilizing these data or the data stored in the 1 bit register FF in ALU cell 23A, the necessary arithmetic operation per bit can be successively processed at the ALU 23B.

For example, in the case of adding up the data (D1) of the memory cell 22A of the data memory unit 22 and the data (D2) of the other memory cell 22A and further writing the addition result CPS) in the. other memory 22A, it operates as follows:

The read-out signal SRAA to the memory cell 22A in which the data D1 of data memory unit 22 is written and the read-out signal SRBA to the memory cell 22A in which the data D2 is written are outputted and these data will be outputted to 2 read-out bit lines respectively.

In the memory cell 22A received the read-out signal SPAA, the transistor Tr13 of that memory cell assumes it on condition and the data corresponding to the electric potential of the capacitor C11 is read out and outputted to one of bit lines. Moreover, in the memory cell 22A received the read-out signal SRBA, the transistor Tr14 of that memory cell assumes it on condition and the data corresponding to the electric potential of the capacitor C11 of that memory cell will be outputted to the other bit line.

The data D1 and D2 read out from the data memory unit 22 cause selectors SEL11–SEL13 to select the fixed path and to add up at the ALU 23B, and make the bit line control signal SBC and its inverted signal SBC' to select the ALU array unit 23 side as a source of write-in bit line of the data memory unit 22 and output the calculation result D3 of the ALU 23B to the write-in bit line.

Furthermore, the write-in memory access signal SWA is outputted to the memory cell 22A of the data memory unit 22 which is desirous to be written the data D3, making the transistor Tr11 of that memory cell to the on condition and the capacitor C11 becomes the electric potential corresponding to the ALU output data D3.

At this point, the arithmetic operation at the ALU cell 23A will be assigned by ALU control signal SALU-CONT from the program. At this point, the ALU 23B in the ALU cell 23A functions as a full adder by ALU control signal SALU-CONT. And these 3 inputs are the data D1 and D2 and carry inputs, and select the predetermined buses by selecting connection points of selectors SEL11–SEL13 and buses shown by X marks.

The ALU 23B outputs the sum (D3) and carry, and the selector SEL14 selects the sum, and the carry is stored in FF13 for the following higher bit calculation. The data stored in this FF13, i.e., the ALU carry output of the previous cycle will be used when the lower bit addition is conducted in a preceding cycle as the carry input described above. In the case where this cycle is the first cycle of addition operation, FF13 is cleared by the ALU control signal SALU-CONT in the preceding cycle in advance.

According to the embodiment described above, two data D1 and D2 will be read out from the data memory unit 22 and receive the required arithmetic operation or logic operation in response to the program, and the addition result D3 can be written in the fixed address of the data memory unit 22. These arithmetic operations are all bit processings and will be processed one bit by one bit per cycle.

When the arithmetic operation which is supposed to be processed in one horizontal scanning period is complete, it becomes necessary to transfer the output data which has already completed the arithmetic operation for that horizontal scanning period at the last part of the program.

This processing can be conducted as follows: By outputting the memory access signal SRAA or SRBA to the memory cell 22A in which the data to be outputted in the data memory 22, read-out will be conducted and passing through the ALU array unit 23 and outputting write-in signal Sow to the output SAM cell 24B of the prescribed bit of the output SAM unit 24, data will be transferred.

The data will be transferred by one bit by one bit through the bit line in the vertical direction. At this point, in case of transferring the data, the data is not processed at the ALU 23B but the data must pass through the ALU cell 23A. The last calculation may be conducted at the ALU 23B. In that case, two data can be read out from the data memory unit 22 and the general calculation using the data stored in the 1 bit register FF in the ALU cell 23A can be executed.

The data read out from the data memory unit 22 is the same as the other cases. Regarding the data passing through the ALU array unit 23, we will omit an explanation since it is clear from the addition operation described above. The data write-in to the output SAM unit 24 is the same as those of the conventional device.

As described above, the transfer of input data DIN stored in the input SAM unit 21 to the data memory unit 22, the required operation processing, and the transfer of output data to the output SAM unit 24 will be controlled by the SIMI control program which makes bit as an unit in one horizontal scanning period. This program processing will be repeated in the same manner as that of the conventional device making the horizontal scanning period as an unit. Since this is SIND control, all processor elements are interconnected and the same processing can be applied to the pixel numbers H for horizontal scanning period.

After completing this program processing, the output data transferred to the output SAM unit 24 will be outputted from the output SAM unit 24 in the following horizontal scanning period. Since this operation is the same as that of the conventional device, a detailed description will be omitted.

The processors shown in FIG. 4 and FIG. 6 according to the embodiment are, if they are general processors, a number of 1-bit processors having the construction shown in FIG. 5 are linearly arrayed. Firstly, the input data DIN is written in the data memory unit 32 through the buffer memory 30 and then the data written in the data memory unit 32 and inputted just now, the data inputted before and the data arithmetically processed before and being processed are selected by two read-out memory addresses SRAA, SRBA and led to the ALU 33 and arithmetically operated and again stored in the other write-in address SWA of the data memory unit 32. Then the arithmetic processing result will be outputted from the data memory unit 32 via the buffer memory 31.

More specifically, the relationship between the processors of FIG. 4 and FIG. 6 and the processor of FIG. 5 is as follows: The input buffer memory 30 corresponds to the input SAM unit 21, the output buffer memory 31 corresponds to the output SAM unit 24, the data memory 32 corresponds to the data memory unit 22, and the ALU 33 corresponds to the ALU array unit 23.

The construction of this kind of processor is called a linear array type since a number of small processor elements are linearly arrayed. However, this is the conception construction. In the actual physical disposition of LSI, all processor elements are not necessarily linearly arrayed.

Three operations consisting of the input operation of the input data DIN writing into the input SAM unit 21, the transfer operation of the input data DIN stored in the input SAM unit 21 to the data memory unit 22 by SIMD control of the program control unit 25 and the required operational processing and transfer of output data to the output SAM unit 24, and the output operation of output data DOUT reading out from the SAM unit 24 are pipe lining operations making one horizontal scanning period of video signal as an unit, and if we pay attention on the input data DIN of one horizontal scanning period, each operation would be executed in the form of delaying for one horizontal scanning period time. However, three operations can be processed simultaneously.

Then, the pipe-line processing per command cycle will be described below according to the present embodiment. So far we have explained that the pipe-lining is conducted making the horizontal scanning period as an unit according to the embodiment similar to the conventional device, but there is no pipe-line processing making the command cycle as an unit. However, since the addition operation forms a cycle starting from the data read-out from the data memory unit 22, operation at the ALU array unit 23 and the write-in to the data memory unit 22, the operation speed is determined by the gate delay of the path and accordingly it cannot be speeded up much.

Since the processing capacity of a processor is determined by multiplying the number of processors and the speed of command executing cycle, it is desirous to increase the speed of command executing cycle. Therefore, the pipe-line processing will be conducted. The pipe-lining is a well-known technique to increase the speed.

Firstly, the double cycling method will be explained. In the case of computing, such as addition, since separate cycles are provided for the data read out from the data memory unit 22 and before the ALU 23B input at the ALU array unit 23, and for from the ALU operation to the write-in to the data memory unit 22, FF11, FF12, FF13 of the ALU cell 22A will be used as the pipe-line register.

There is another double cycling method. Since two separate cycles are provided for the data read-out from the data memory unit 22, and to the operation of ALU array unit 23 at the ALU 23B, and for the write-in from the ALU output to the data memory unit 22, FF14 of the ALU cell 23A will be used as a pipe-line register.

With these arrangements, the speed will be almost doubled, to be precise, the increase rate is a little less than 2 times. Then, a three cycling method can be considered. Since three separate cycles are provided for the data read out from the data memory unit 22 and before the ALU 23B is inputted at the ALU array unit 23, the operation at the ALU 23B, and till the ALU output is written in the data memory unit 22, FF11, FF12, FF13 of the ALU cell 23A and FF14 of the ALU cell 23A are utilized as two stage pipe-line register. With this arrangement, a little under three times higher speed can be achieved.

Figure 10:
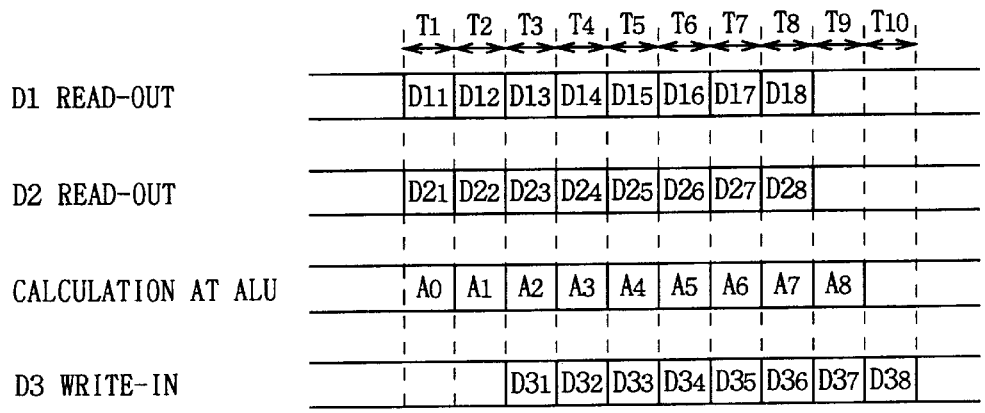
FIG. 10 is a timing chart explaining the operation in the case of 3 cycling pipeline processing.

The computational operation in case of three cycling will be explained below referring to FIG. 10. Ts are command cycles and suffixes show the times elapsed. D1, D2 and D3 represent the same as the addition example described above. Also, A implies calculation at the ALU 23B. Supposing that D1, D2 and D3 are 8 bit word length, these suffixes show the state in which the calculation will be processed sequentially from the lowest bit. Provided that AO is the cycle for clearing the FF13 carry initially.

In the three cycling pipe-line processing, there are three cycles from the read-out to the write-in thus causing the delay of two cycle times, but the operation speed will be increased as a whole. Since there occurs the delay of two-cycle time, the address collision between read-out and write-in in the three port memory must be avoided considering the limitations.

Regarding the problem of access conflict of 3 port memory, if the program were assembled delaying cycles so that the addressing conflict does not occur when determining the program, the conflict can be prevented. It is essential that the address difference may be always guaranteed and the address space must be used properly in every processing from the beginning. Basically, these memory address conflicts can be controlled at the time of programming and the possible conflicts can be prevented. And if circumstances require, the program can be automatically corrected thus preventing the address conflicts at a compiler or an assembler in place of a programmer.

In the processor 20 of the embodiment, the data memory cells are more complicated than the conventional processor 1. However, in the conventional processor, these cells occupy smaller circuit area as compared with the ALU cells and the area distribution of one longitudinal processor element of FIG. 3 and is ill-balanced and the width of ALU cell and the width of SAM cell and data memory cell are ill-balanced. With due regard to the above, the area distribution of SAM cells 21B, 24B and data memory cell 22A is balanced but being complicated.

According to the foregoing construction, since the data memory unit 22 is formed by a 3-port memory, the restriction that each of 2 data memory units must have its own operation input data which occurs frequently in the 2 data memory structure such as the conventional one no longer applies when arithmetically processing the data. Also, the data transfer between two data memory units which was necessary in the conventional processor prior to the arithmetic processing becomes unnecessary.

Similarly, in the case of transferring the arithmetically processed output to the output SAM unit 24, it becomes unnecessary to transfer the arithmetic processing result in the data memories for preparation in advance.

Furthermore, since the processor of the present embodiment has only one data memory unit 22, these additional data transfers become unnecessary and the problem which occurred in the conventional 2 data memory units due to the insufficient memory capacity or surplus memory capacity in one of 2 data memory units does not occur and its construction can be very flexible.

Furthermore, since the read modified write operation will not be conducted, the command cycle can be shortened and high speed can be achieved. Moreover, since the data memory unit 22 is formed by a 3 port memory having its own bit lines, the pipeline processing can be applied easily.

Moreover, by conducting the pipeline processing, the path from reading out the data from two data sources and the arithmetic processing at the ALU and till writing in the data destination will be cut off. As a result, the command cycle can be shortened and the speed can be increased. In this connection, a little under 3 times higher speed can be achieved by the 3 cycling pipeline processing, although 3 times higher speed is impossible.

Accordingly, the video signal processor 20 having outstandingly improved processing power can be realized.

The embodiment described above has dealt with the case of providing an input SAM unit 21 and an output SAM unit 24 separately. However, the present invention is not only limited to this but also they can be combined easily into one serial access memory construction since the input SAM unit 21 and the output SAM unit 24 are both serial access memory and have similar constructions.

Furthermore, the embodiment described above has dealt with the case of forming the data memory unit 22 with 3 port memory construction. More specifically, since the ALU array unit 23 of the present invention may be constructed to read out two data and write in one data simultaneously, if it is constructed by 2 port memory, 2 data read out may be conducted by one cycle and the write-in of the other data may be conducted by the other cycle. In this connection, if it has 3 port memory construction, 2 read outs and one write-in can be conducted by one cycle as described above at the same time. Furthermore, if it is constructed by the memory with more than 4 ports, the operation can be processed with shorter cycle in the case where the ALU array unit 23 conducts such as addition arithmetic processing.

Furthermore, the embodiment described above has shown the vertical array of each cell of the input SAM unit 21, data memory unit 22 and output SAM unit 24 in FIGS. 6–9. However, the construction of FIGS. 6–9 are the general construction which makes easy to understand and accordingly, various constructions other than FIGS. 6–9 can be used as the construction of each cell.

According to the present invention described above, in a multi-parallel digital signal processor type video signal processor wherein bit processing processor elements are linearly arrayed, since at least a serial access memory unit, a data memory unit and an ALU array unit are provided as its construction element and the data memory unit is formed by the memory with more than 3 ports, the data transfer between two data memory units prior to processing operation which was needed in the conventional 2 data memory construction becomes unnecessary and thereby the video signal processor having outstandingly improved processing power can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A multi-parallel digital video signal processor wherein a plurality of bit-wise processor elements are linearly arrayed, comprising:

an input serial-access memory unit formed by plural serially accessed memory cells in which data bits are inputted into successive ones of said memory cells by a programmed-controlled pointer;

a data memory unit comprising memory cells of three ports or more, for writing-in said data read out from said memory cells of said serial-access memory unit on a bit-wise basis;

an arithmetic logic unit array responsive to stored-program control so as to read out said data stored in said data memory unit on a bit-wise basis, perform a program-prescribed arithmetic operation in the arithmetic logic unit, and write-in the arithmetic result of said arithmetic operation to said data memory again;

an output serial-access memory unit, formed by plural serial access memory cells and controlled so that said arithmetic result will be outputted from successive ones of said memory cells by a programmed-controlled pointer; and a programmed control unit connected to said input serial-access memory, said data memory unit, said arithmetic logic unit, and said output serial-access memory for effecting control of at least said program-controlled pointer.

2. The video signal processor according to claim 1, wherein said data memory unit comprises, at least, two read-out ports and, at least, one write-in port.

3. The video signal processor according to claim 2, wherein
the bit line for each port of said data memory unit is dedicated to write-in or read-out.

4. The video signal processor according to claim 3, wherein
said arithmetic logic unit array unit has a pipe-line register, at least, either before said arithmetic unit or after said arithmetic unit.

5. The video signal processor according to claim 2, wherein input from said input serial access memory unit or input from said arithmetic logic unit array unit is selectively supplied to said data memory unit.

6. The video signal processor according to claim 2, wherein said at least two read-out ports are connected to the input portion of said arithmetic logic unit array unit and said at least one write-in port is connected to the output portion of said arithmetic logic unit array unit.

7. The video signal processor according to claim 1, wherein said input serial access memory unit, said data memory unit and said output serial access memory are placed in the same address space.

\* \* \* \* \*